United States Patent
Satake et al.

(10) Patent No.: US 6,639,600 B2
(45) Date of Patent: Oct. 28, 2003

(54) IMAGE DRAWING METHOD, IMAGE DRAWING APPARATUS, RECORDING MEDIUM, AND PROGRAM

(75) Inventors: Yoshikazu Satake, Tokyo (JP); Hiromichi Takahashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 262 days.

(21) Appl. No.: 09/870,107

(22) Filed: May 30, 2001

(65) Prior Publication Data

US 2002/0033825 A1 Mar. 21, 2002

(30) Foreign Application Priority Data

May 31, 2000 (JP) ........................................ 2000-163545

(51) Int. Cl.⁷ ............................. G09G 5/00; G06T 13/00
(52) U.S. Cl. ........................................ 345/473; 345/629
(58) Field of Search ................................ 345/418, 419, 345/629, 633, 638, 689, 473

(56) References Cited

U.S. PATENT DOCUMENTS 6,243,104 B1 * 6/2001 Murray ........................ 345/629
6,329,994 B1 * 12/2001 Gever et al. ................. 345/473

\* cited by examiner

*Primary Examiner*—Matthew Luu
(74) *Attorney, Agent, or Firm*—Fitch, Even, Tabin & Flannery

(57) ABSTRACT

Same message data indicative of one message is stored in a plurality of frame data corresponding to the number of frames for displaying the message for a predetermined period of time. The message data includes data packets of compressed data parts and indexes. The compressed data parts as data units (words) of the message are stored in sector data SD of the frame data and decompressed to generated bitmap data. The indexes indicate positions of the bitmap data and are stored in sector headers SH.

20 Claims, 16 Drawing Sheets

FIG. 3

| FRAME DATA | | | | |
|---|---|---|---|---|
| ·CAMERA DATA<br>  ·ROTATION MATRIX DATA<br>  ·ROTATION ANGLE DATA<br>  ·SCREEN DISTANCE DATA<br>  ·COORDINATE DATA | ·POINT LIGHT SOURCE DATA × NUMBER OF LIGHT SOURCE<br>  ·COORDINATE DATA<br>  ·COLOR DATA | ·MOTION DATA<br>  [NORMAL MOTION DATA]<br>  ·MODEL NUMBER<br>  ·NUMBER OF MOTION DATA<br>  ·MOUTH DATA<br>  ·EYE DATA<br>  ·ROTATION ANGLE DATA<br>  ·COORDINATE DATA<br>  ·MOTION DATA<br>    (ROTATION ANGLE DATA, COORDINATE DATA)<br>    × NUMBER OF MOTION DATA<br><br>  [MOTION DATA WITH ZOOM RATIO]<br>  ·MODEL NUMBER<br>  ·NUMBER OF MOTION DATA<br>  ·MOUTH DATA<br>  ·EYE DATA<br>  ·ROTATION ANGLE DATA<br>  ·COORDINATE DATA<br>  ·ZOOM RATIO<br>  ·MOTION DATA<br>    (ROTATION ANGLE DATA, COORDINATE DATA)<br>    × NUMBER OF MOTION DATA | ·MESSAGE DATA PART<br>  ·INDEX (WORD-BY-WORD BASIS)<br>  ·DATA PART SIZE (WORD-BY-WORD BASIS)<br>  ·COMPRESSED DATA PART | ·MESSAGE TEXTURE INFORMATION (OF PRESENT FRAME)<br>  ·MESSAGE TEXTURE ID<br>  ·TRANSMISSION WIDTH<br>  ·TRANSMISSION HEIGHT<br>  ·DURATION OF ANIMATION (NUMBER OF FRAMES) |

FIG. 4

SECTOR HEADER

- SECTOR NUMBER IN FRAME
- NUMBER OF SECTORS IN FRAME
- FRAME NUMBER IN STREAMING DATA
- FRAME SIZE (Fmax)
- USER-DEFINED AREA
  - NUMBER OF LIGHT SOURCE DATA
  - NUMBER OF MOTION GROUPS
  - ZOOM RATIO FOR LIGHT SOURCE CALCULATION
  - MESSAGE TEXTURE DATA INDEX (WORD-BY-WORD BASIS)
  - PAD VIBRATION DATA ID
  - MESSAGE DATA PART INDEX (WORD-BY-WORD BASIS)

IMAGE DRAWING METHOD, IMAGE DRAWING APPARATUS, RECORDING MEDIUM, AND PROGRAM

BACKGROUND OF THE INVENTION

1. Field of the Invention

The present invention relates to an image drawing method and an image drawing apparatus which are applicable to animations displayed while and before an actual scenario of a video game is executed. For example, the image drawing method and the image drawing apparatus are suitably utilized for displaying an animation of three-dimensional images of characters and messages in the game scenario. Further, the present invention relates to a recording medium for storing a program to carry out the image drawing process, and also relates to the program itself.

2. Description of the Related Art

In recent years, there has been a rapid advancement of computer graphics techniques such as hidden line removal, hidden surface removal, smooth shading, and texture mapping thanks to the dramatic development of hardware.

Generally, with the computer graphics techniques, images are generated by the following procedure. Firstly, a plurality of three-dimensional objects are generated by three-dimensional modeling (computer aided design). Then, rendering is performed by adding optical properties such as specular reflection, diffuse reflection, refraction, and transparency to the objects with the shading technique, by adding surface patterns to the objects, and by plotting images depending on surroundings such as a window and scenery reflections and ambient light.

Some information processing machines are used for entertaining users. An example of such information processing machines is an entertainment apparatus such as a video game machine. The entertainment apparatus is used in an entertainment system and capable of reproducing game data recorded in a recording medium such as a CD-ROM on the screen of a TV receiver according to data inputted from an input device.

In the entertainment system, the entertainment apparatus and the input device are normally connected to each other by serial interfaces. When a clock signal is sent from the entertainment apparatus to the input device, the input device sends key switch information corresponding to manual input actions of the user in synchronism with the clock signal.

Recently, the input device is equipped with internal vibration generating means for giving vibrations (shocks) to the user in response to a request from an external drive, for example, the entertainment apparatus. That is, while a game is in progress on the entertainment apparatus, the entertainment apparatus generates various vibrations according to data inputted from the user and gives such vibrations to the user.

Under the circumstances, various types of games utilizing the above-described entertainment apparatus (video game machine) such as a role playing game, a shooting game, a driving game, and a fighting game are available on the market.

In the above types of video games, a beautiful vivid animation (movie) for introducing the basic story or the main character of the video game is displayed on the screen. The animation is intended to attract users into the scenario of the video game.

However, in the conventional video games, once the actual game scenario is started, the quality of images tends to be degraded. For example, the main character is beautifully depicted as a well-proportioned character in the introductory animation. However, once the actual game scenario is started, the main character is awkwardly depicted as a cartoon-like character. Therefore, the user tends to be disappointed and lose interest in playing the game.

Because of the difference (gap) in the image quality, the user hardly identifies himself with the main character in a role-playing game or an adventure game. Mostly, the user is dedicated to merely find items, kill monsters, or try to finish the game scenario as soon as possible like a time trial. The user cannot enjoy visiting a lot of places or solving riddles as the main character in the role-playing game or the adventure game as intended by the game creators.

One solution for eliminating the above gap is to display polygon images of objects in real time in both of the animation in the actual game scenario and the introductory animation.

However, in the above method using polygon images, there are some difficulties in processing message data. In the case of displaying an animation of two-dimensional images, message data recorded in a CD-ROM or the like can be directly outputted on the screen. However, in the case of displaying an animation of three-dimensional images, it is necessary to draw polygon images one by one by converting vertex data of object data based on motion data read from a CD-ROM. Therefore, it is necessary to take some measures to associate message data and motion data, and to handle reading errors.

SUMMARY OF THE INVENTION

The present invention has been made taking the above circumstances into account, and an object thereof is to provide an image drawing method, an image drawing apparatus, a recording medium, and a program applicable to animations displayed while and before an actual scenario of a video game is executed. According to the present invention, it is possible to display polygons of various objects in real time in both of the animations. Further, according to the present invention, it is possible to display messages clearly regardless of the presence of reading errors.

According to the present invention, an image drawing method comprises the steps of:

reading streaming data made up of a lot of frame data sector by sector;

performing an object drawing process to display an animation of three-dimensional images on a screen based on at least motion data in each of the frame data; and performing a message drawing process to display messages on the screen based on message data in each of the frame data, wherein same message data indicative of one message is stored in a plurality of frame data of the streaming data, the message data comprising a plurality of packet data each indicating a message image and a plurality of index data each indicating positional information of a message image; and wherein, in the message drawing process, message images indicated by a plurality of packet data are drawn at predetermined positions based on a plurality of index data to display a message on the screen.

Further, according to the present invention, an image drawing apparatus comprises:

means for reading streaming data made up of a lot of frame data sector by sector;

means for performing an object drawing process to display an animation of three-dimensional images on a screen based on at least motion data in each of the frame data; and means for performing a message drawing process to display messages on the screen based on message data in each of the frame data, wherein same message data indicative of one message is stored in a plurality of frame data of the streaming data, the message data comprising a plurality of packet data each indicating a message image and a plurality of index data each indicating positional information of a message image; and wherein the means for performing a message drawing process draws message images indicated by a plurality of packet data at predetermined positions based on a plurality of index data to display a message on the screen.

Further, according to the present invention, a recording medium stores a program comprising the steps of:

reading streaming data made up of a lot of frame data sector by sector;

performing an object drawing process to display an animation of three-dimensional images on a screen based on at least motion data in each of the frame data; and performing a message drawing process to display messages on the screen based on message data in each of the frame data, wherein same message data indicative of one message is stored in a plurality of frame data of the streaming data, the message data comprising a plurality of packet data each indicating a message image and a plurality of index data each indicating positional information of a message image; and wherein, in the step of performing a message drawing process, message images indicated by a plurality of packet data are drawn at predetermined positions based on a plurality of index data to display a message on the screen.

Further, according to the present invention, a program comprises the steps of:

reading streaming data made up of a lot of frame data sector by sector;

performing an object drawing process to display an animation of three-dimensional images on a screen based on at least motion data in each of the frame data; and performing a message drawing process to display messages on the screen based on message data in each of the frame data, wherein same message data indicative of one message is stored in a plurality of frame data of the streaming data, the message data comprising a plurality of packet data each indicating a message image and a plurality of index data each indicating positional information of a message image; and wherein, in the step of performing a message drawing process, message images indicated by a plurality of packet data are drawn at predetermined positions based on a plurality of index data to display a message on the screen.

In the object drawing process, streaming data is read sector by sector. Then, image processing for displaying an animation of three-dimensional images on a screen is performed based on at least motion data in each of the frame data.

In the message drawing process, a plurality of valid packet data and a plurality of valid index data are read from a plurality of frame data storing same message data. Then, message images indicated by the plurality of valid packet data are drawn at predetermined positions based on the plurality of valid index data.

Thus, the motion data for displaying an animation of three-dimensional images and the message data for displaying messages can be stored in the streaming data. As a result, it is possible to display polygons of various objects on the screen in real time in both of the animations displayed while and before an actual scenario of a video game is executed. Further, it is possible to display messages on the screen.

Same message data indicative of one message is stored in a plurality of frame data of the streaming data and the message data comprises a plurality of packet data each indicating a message image and a plurality of index data each indicating positional information of a message image. Accordingly, it is possible to reduce packet losses in reading streaming data and reliably display messages on the screen.

Each of packet data is compressed data. In the message drawing process, a plurality of packet data are decompressed to generate message images and the generated message images are drawn at predetermined positions based on a plurality of index data to display a message on the screen. Accordingly, the amount of data for recording message data can be effectively reduced.

A plurality of packet data may be stored successively in a plurality of sectors of one frame data, and each of index data may be stored in a sector header. Accordingly, it is possible to reduce errors in reading packet data or index data.

Preferably, same message data is stored in a plurality of frame data corresponding to the number of frames needed for displaying a message for a predetermined period of time.

In reading the streaming data sector by sector, errors are detected and validity of at least the message data in one frame is determined based on information of the detected errors. Invalid packet data and index data in the message data can be compensated by reading same message data in another frame data. Accordingly, even if there is an error in reading message data in one frame data, it is possible to clearly display the message on the screen.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a view showing details of frame data;

FIG. 4 is a view showing details of a sector header;

DESCRIPTION OF THE PREFERRED EMBODIMENTS

An image drawing method, an image drawing apparatus, a recording medium, and a program according to the present invention will be described to with reference to FIGS. 1 through 16. The image drawing method, the image drawing apparatus, the recording medium, and the program are applied to an entertainment apparatus for performing three-dimensional CG (computer graphics) processing. The entertainment apparatus will be simply referred to as the entertainment apparatus according to the present embodiment.

Figure 1:
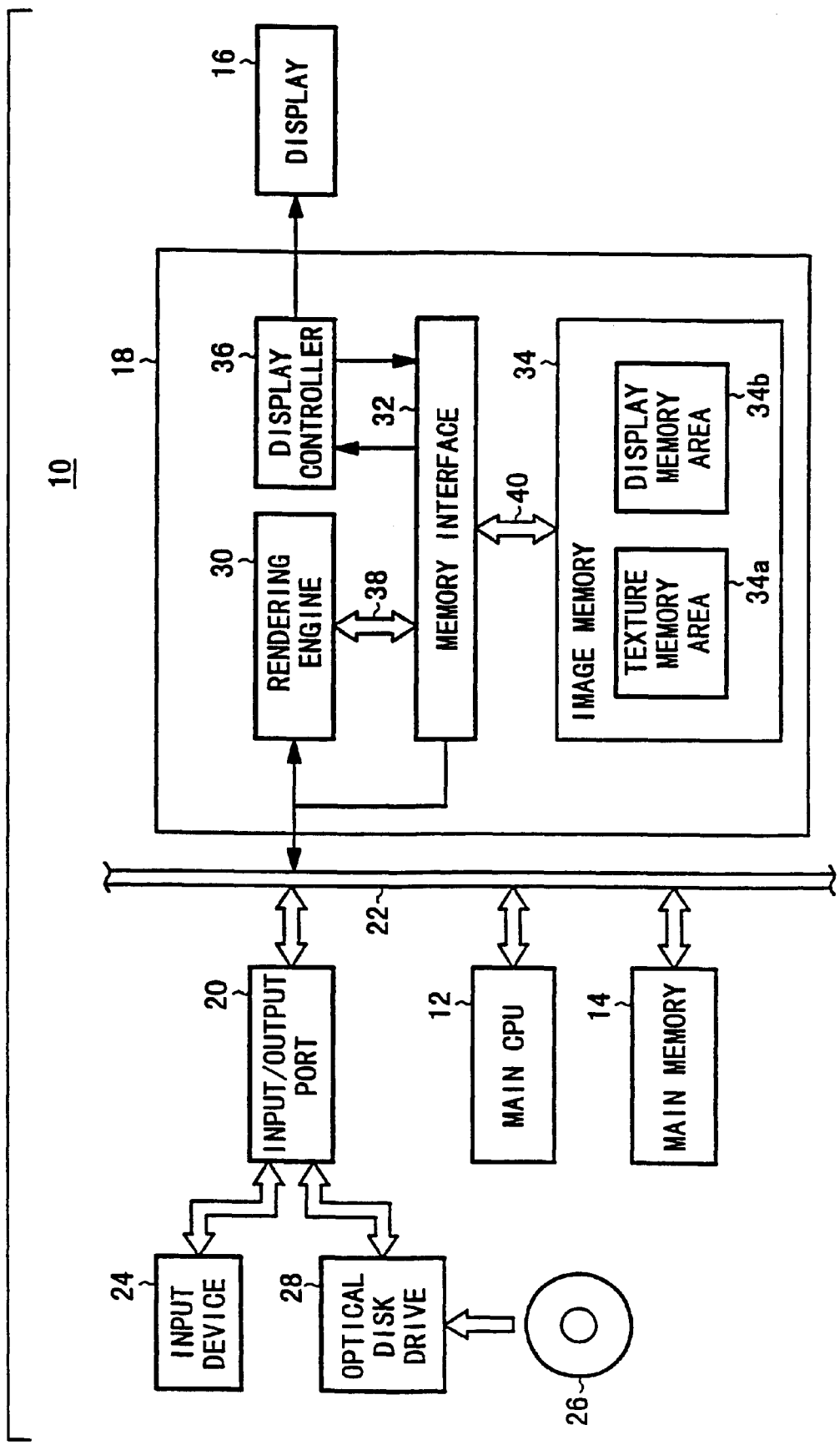
FIG. 1 is a block diagram showing an arrangement of an entertainment apparatus according to an embodiment of the present invention.

As shown in FIG. 1, the entertainment apparatus 10 according to the present embodiment comprises a main CPU 12 for controlling the overall operation of the entertainment apparatus 10, a main memory 14 for executing various programs and storing various data, an image processor 18 for generating image data under the control of the main CPU 12 and outputting the generated image data to a display (e.g., CRT) 16, and input/output ports 20 for transmitting data between the entertainment apparatus 10 and external devices.

The main memory 14, the image processor 18, and the input/output ports 20 are connected to the main CPU 12 by a bus 22. The input/output ports 20 are connected an input device 24 for entering data (key entry data, coordinate data, etc.) into the entertainment apparatus 10, and an optical disk drive 28 for playing back an optical disk 26 such as a CD-ROM which stores various programs and data (object data, texture data, etc.), for example.

The image processor 18 comprises a rendering engine 30, a memory interface 32, an image memory 34, and a display controller 36 such as a programmable CRT controller.

The rendering engine 30 draws (renders and stores) image data in the image memory 34 via the memory interface 32 in response to rendering commands supplied from the main CPU 12.

A first bus 38 is connected between the memory interface 32 and the rendering engine 30, and a second bus 40 is connected between the memory interface 32 and the image memory 34. Each of the first and second buses 38, 40 has a bus width of 128 bits, for example, for allowing the rendering engine 30 to draw image data in the image memory 34 at high speed.

The rendering engine 30 is capable of rendering image data of 320×240 pixels or image data of 640×480 pixels, or image data in NTSC or PAL format on a real-time basis, i.e., a plurality of times, ranging from more than ten to several tens, per 1/60 to 1/30 second.

For example, the image memory 34 is a unified memory capable of designating a texture memory area 34a and a display memory area 34b in the same area.

The display controller 36 writes texture data read by the optical disk drive 26 and texture data generated in the main memory 14 into the texture memory area 34a of the image memory 34 via the memory interface 32, and reads image data drawn in the display memory area 34b of the main memory 14 via the memory interface 32, and outputs the image data on the screen of the display 16.

Next, a characteristic function of the entertainment apparatus 10 according to the present embodiment will be described with reference to FIGS. 2 through 16.

The characteristic function can be carried out in the following manner. Firstly, information is read from streaming data comprising a lot of frame data FD (FD1, FD2, FD3, . . . ) such that sector data SD are successively read sector by sector. Then, an object drawing process of displaying an animation of three-dimensional images on the screen is performed at least based on motion data in each of the frame data FD. Then, a message drawing process of displaying messages on the screen is performed based on message image data in each of the frame data FD.

Figure 2:
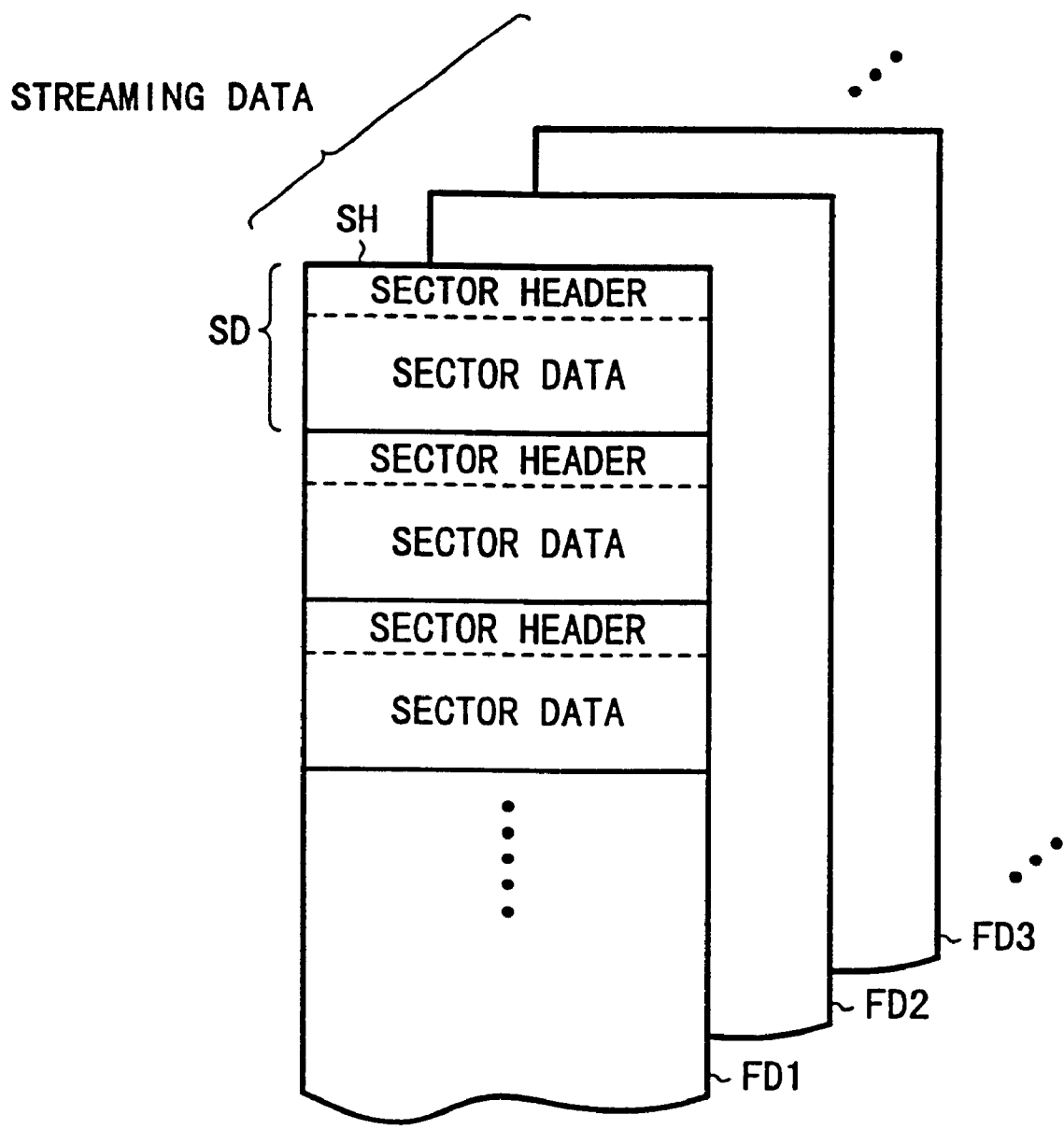
FIG. 2 is a view showing details of streaming data.

The details of the streaming data will be described hereinbelow. As shown in FIG. 2, the streaming data is made up of a lot of frame data FD (FD1, FD2, FD3, . . . ).

FIG. 3 shows a data structure of one frame data FD.

The frame data FD comprises camera data, point light source data, motion data, message data parts TDP, and message texture information.

The camera data comprises rotation matrix data, rotation angle data, screen distance data, and coordinate data.

The point light source data comprises coordinate data and color data. The number of point light source data in the frame data FD corresponds to the number of light sources.

As for the motion data, there are two types. One motion data (normal motion data) comprises a model number, the number of motion data, mouth data, eye data, rotation angle data, and coordinate data. The other motion data comprises a model number, the number of motion data, mouth data, eye data, rotation angle data, coordinate data, and zoom ratio data. Both types of the motion data comprise a plurality of motion data (rotational angle data and coordinate data) corresponding to the number of motion data.

The message data parts TDP are compressed data parts constituting a message texture. That is, the number of message data parts TDP corresponds to the number of words (data units) in a message. Each of the message data parts TDP comprises a message data part index PI, a data part size, and a compressed data part DP. The message data parts TDP are stored in sectors (data packets) of the frame data FD.

The message texture information comprises a message texture ID, a transmission width (message width), and a transmission height (message height) and a duration of the animation (the number of frames needed for displaying a message for a predetermined period of time). Each of the frame data FD comprises one piece of the message texture information.

As shown in FIG. 2, the frame data FD is divided into 2048 bytes of sectors, i.e., units of sector data SD, for example. Each sector has 32 bytes of header data (sector header SH), for example. That is, the effective volume (data storage area) of one sector data SD is 2016 bytes (2048−32=2106).

The details of the sector header SH is shown in FIG. 4. The sector header SH comprises a sector number in the frame, the number of sectors constituting the frame, a frame number in the streaming data, a frame size (Fmax), and a user-defined area.

The user-defined area comprises the number of light source data, the number of motion groups, zoom ratio data for performing light source calculation, a message texture data index DI (word-by-word basis), pad vibration data ID, a message data part index PI (word-by-word basis). In the following explanation, the message texture data index DI and the message data part index PI will be simply referred as the data index DI and the part index PI, respectively.

Next, the relationship between the message data part TDP stored in the sector data SD, and the data index DI and the part index PI stored in the sector header SH will be described with reference to an example of a screen image shown in FIG. 5 and a conceptual view shown in FIG. 6.

Figure 5:
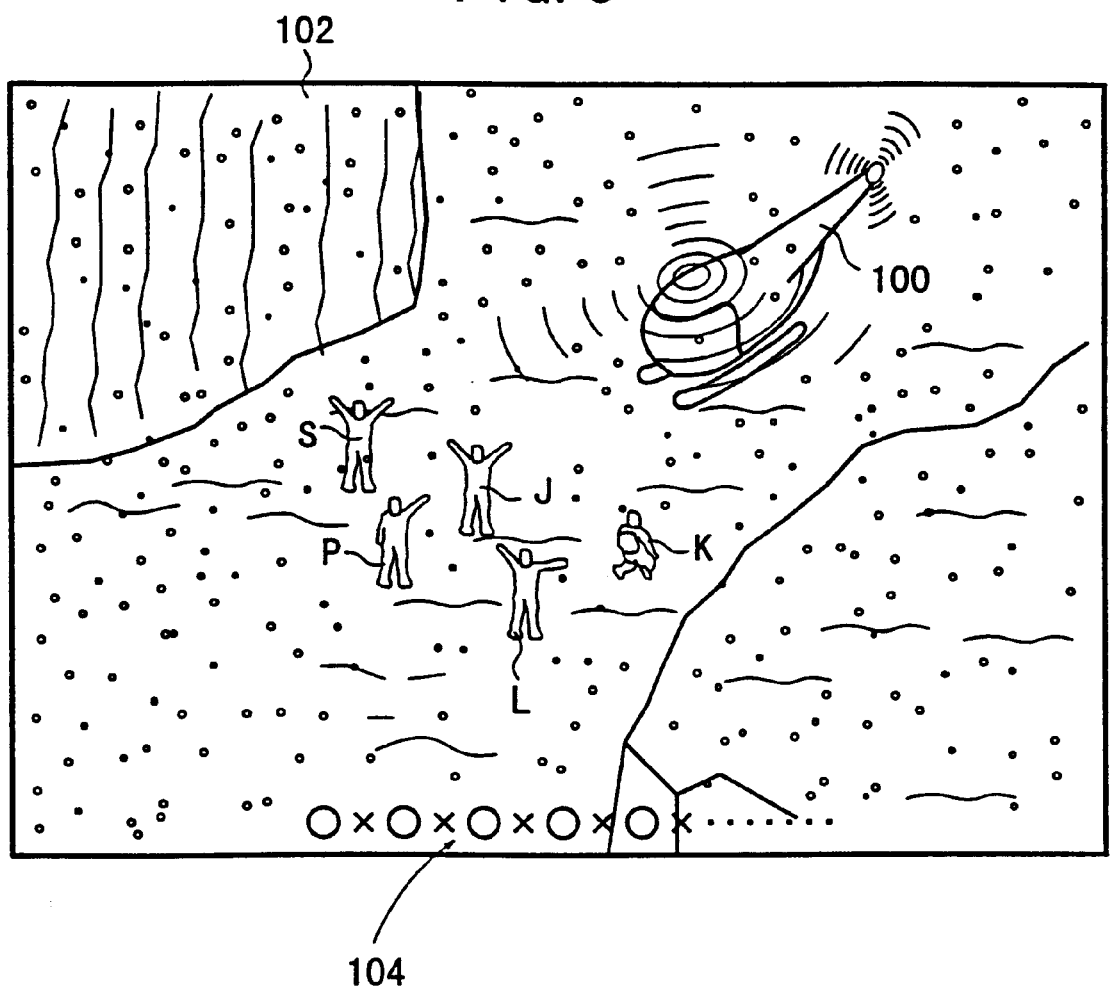
FIG. 5 is an example of a screen image displayed using the entertainment apparatus according to the present embodiment.
Figure 6:
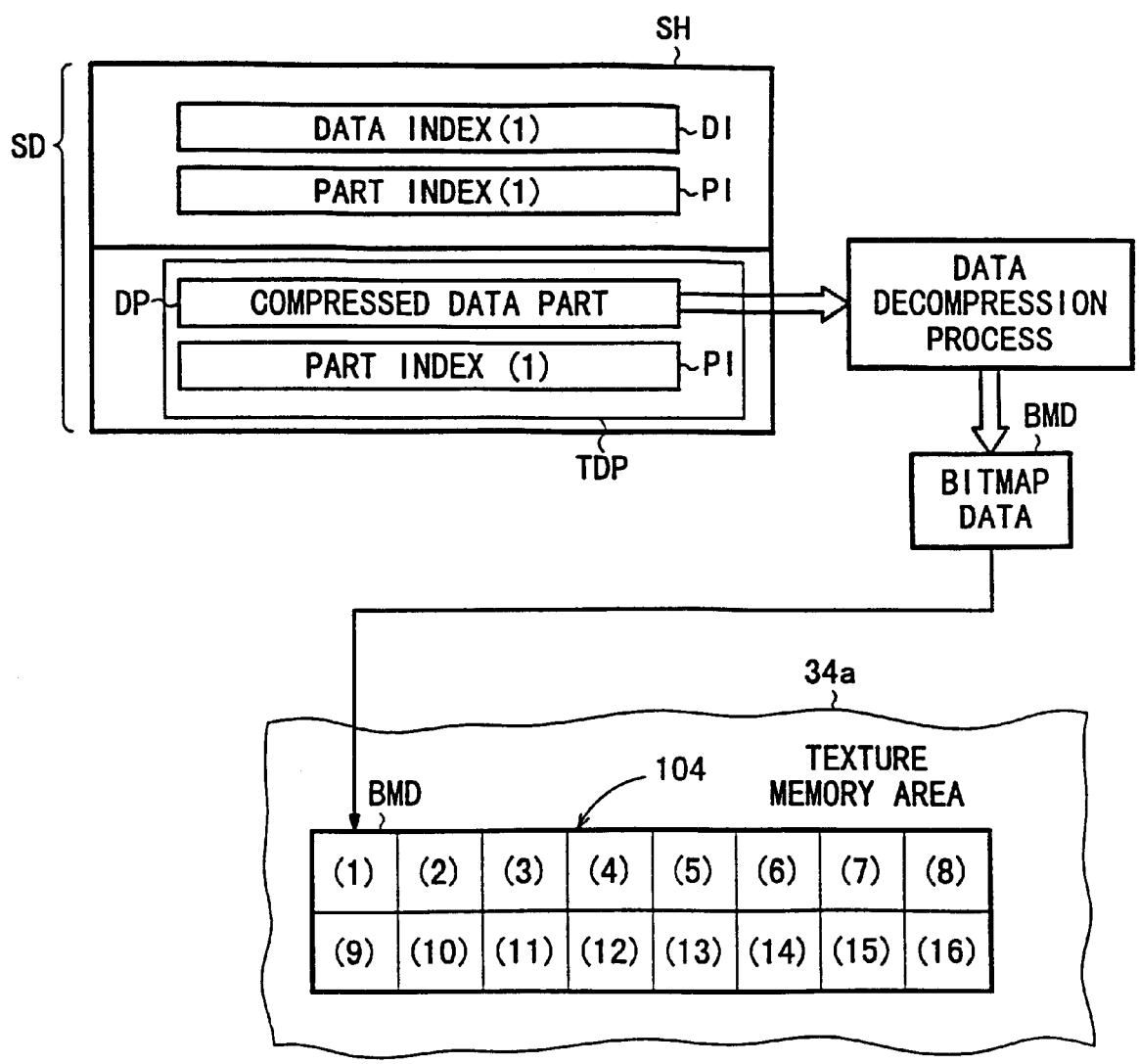
FIG. 6 is a view showing a process of generating a message based on a message data part registered in sector data and indexes registered in a sector header.

As shown in FIG. 5, three-dimensional images of objects (five characters J, K, L, S and P, and a helicopter 100) are displayed on a screen 102. Further, a message (message image) 104 is displayed at the bottom of the screen 102. As shown in FIG. 6, the message image 104 is divided into a plurality of images, i.e., two rows and eight columns of bitmap data BMD, for example.

Each of the bitmap data BMD is compressed as a compressed data part DP constituting a message data part TDP in sector data SD. The positional information of the bitmap data BMD is defined by a part index PI and a data index DI registered in a sector header SH. That is, based on the part index PI of the message data part TDP in the sector data SD, it is possible to easily retrieve the data index DI which generally indicate the positional information of the bitmap data BMD.

Since the part index PI is registered in both of the sector header SH and the message data part TDP (sector data SD), the compressed data part DP to be registered in the sector data SD can be easily identified. Therefore, time needed for program debugging and system maintenance can be reduced.

The method of displaying the message image 104 will be described. Firstly, sector data SD is read from frame data FD. Then, a compressed data part DP of a message data part TDP in the read sector data SD is decompressed into bitmap data BMD. Then, the bitmap data BMD is drawn in the texture memory area 34a of the image memory 34 at a coordinate position indicated by a data index DI in the sector header SH of the read sector data SD. By repeating the above processing sequence, a message 104 to be displayed in a frame is generated. By drawing the generated message 104 at a predetermined coordinate position in the display memory area 34b of the image memory 34, the message 104 is displayed on the screen as shown in FIG. 5.

The part index PI may be used for determining whether a compressed data part DP corresponding the part index PI is decompressed and drawn as bitmap data BMD or not.

In the above example, one sector data SD includes a message data part TDP. That is, the sector data SD includes a compressed data part DI corresponding to a part index PI stored in the sector header SH of the sector data SD. Alternatively, one sector data SD may include a plurality of message data parts TDP. In this case, compressed data parts DP can be retrieved based on part indexes PI stored in the sector header SH of the sector data SD.

According to the present embodiment, one frame data FD includes a plurality of message data parts TDP, i.e., a plurality of data indexes DI and a plurality of part indexes PI as message data (data needed for displaying a message).

Assuming that a plurality of frame data FD (FD1, FD2, FD3, . . . ) defines the same message, the plurality of frame data FD store the same message data. According to the present embodiment, the number of frame data FD corresponds to the number of frames needed for displaying a message for a predetermined period of time. The same message data is stored in each of the frame data FD.

Figure 7:
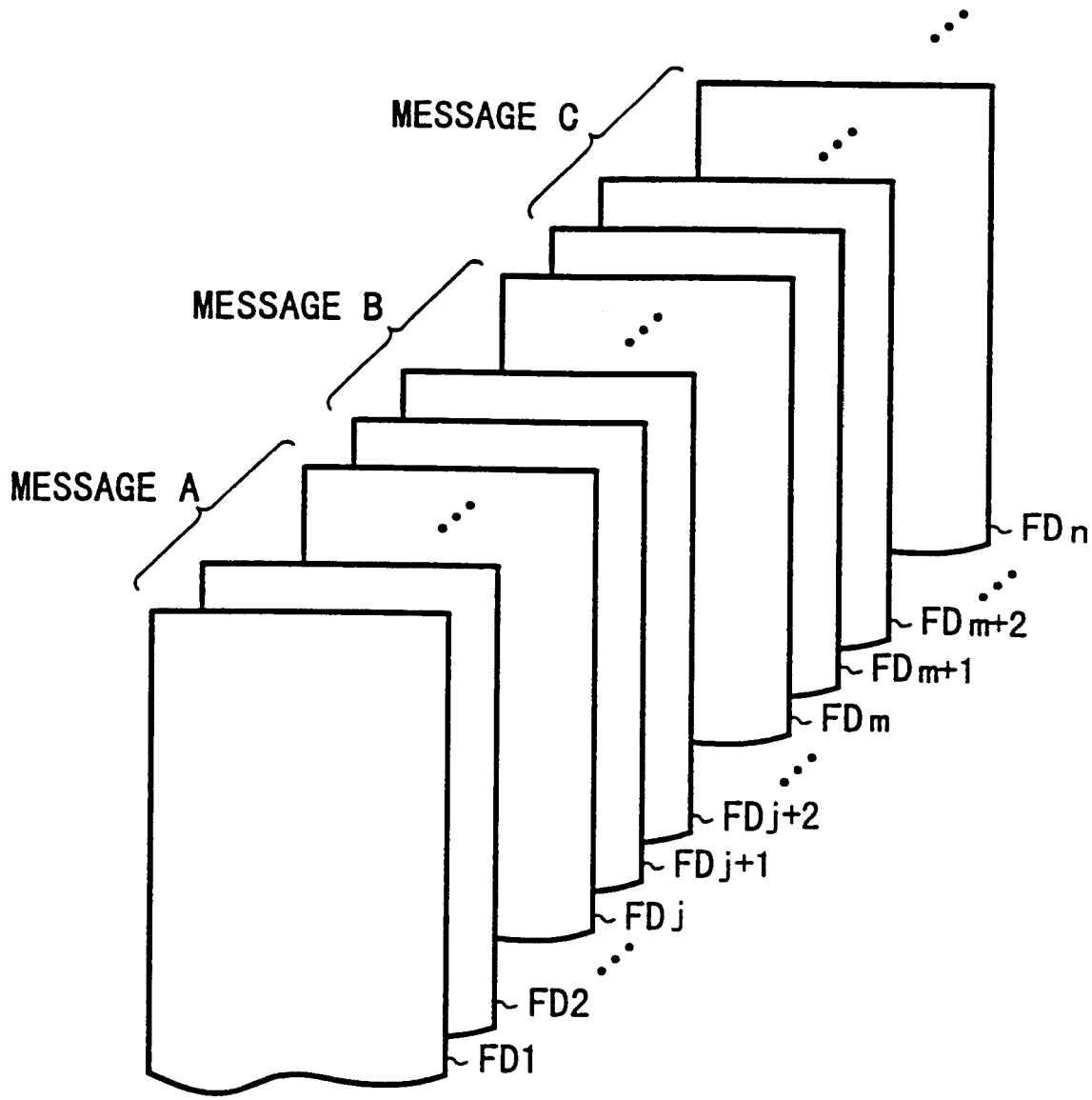
FIG. 7 is a showing an example in which same message data is stored in a plurality of frame data.

FIG. 7 shows an example of the data structure. The message A is displayed on the screen based on a plurality of frame data FD (FD1, FD2, . . . , FDj). The message B is displayed on the screen based on a plurality of frame data FD (FDj+1, FDj+2, . . . , FDm). The message C is displayed on the screen based on the frame data FD (FDm+1, FDm+2, . . . , FDn). That is, each of the frame data FD (FD1, FD2, . . . , FDj) stores the same data of the message A, each of the frame data FD (FDj+1, FDj+2, . . . , FDm) stores the same data of the message B, and each of the frame data FD (FDm+1, FDm+2, . . . , FDn) stores the same data of the message C.

Next, an example of software (image drawing means 200) for carrying out the above characteristic function will be described with reference to FIGS. 8 through 16.

The image drawing means 200 can be supplied to the entertainment apparatus 10 by a randomly accessible recording medium such as the optical disk 26. Alternatively, the image drawing means 200 can be downloaded via a network such as the Internet or downloaded via a satellite communication or the like to the entertainment apparatus 10. In the following explanation, it is assumed that the image drawing means 200 is read from an optical disk 26 and executed by the entertainment apparatus 10.

Specifically, the optical disk 26 is played back by the optical disk drive 28 of the entertainment apparatus 10 to read the image drawing means 200. The read image drawing means 200 is stored in the main memory 14 of the entertainment apparatus 10 by a predetermined process. Then, the image drawing means 200 is executed by the main CPU 12 of the entertainment apparatus 10.

Figure 8:
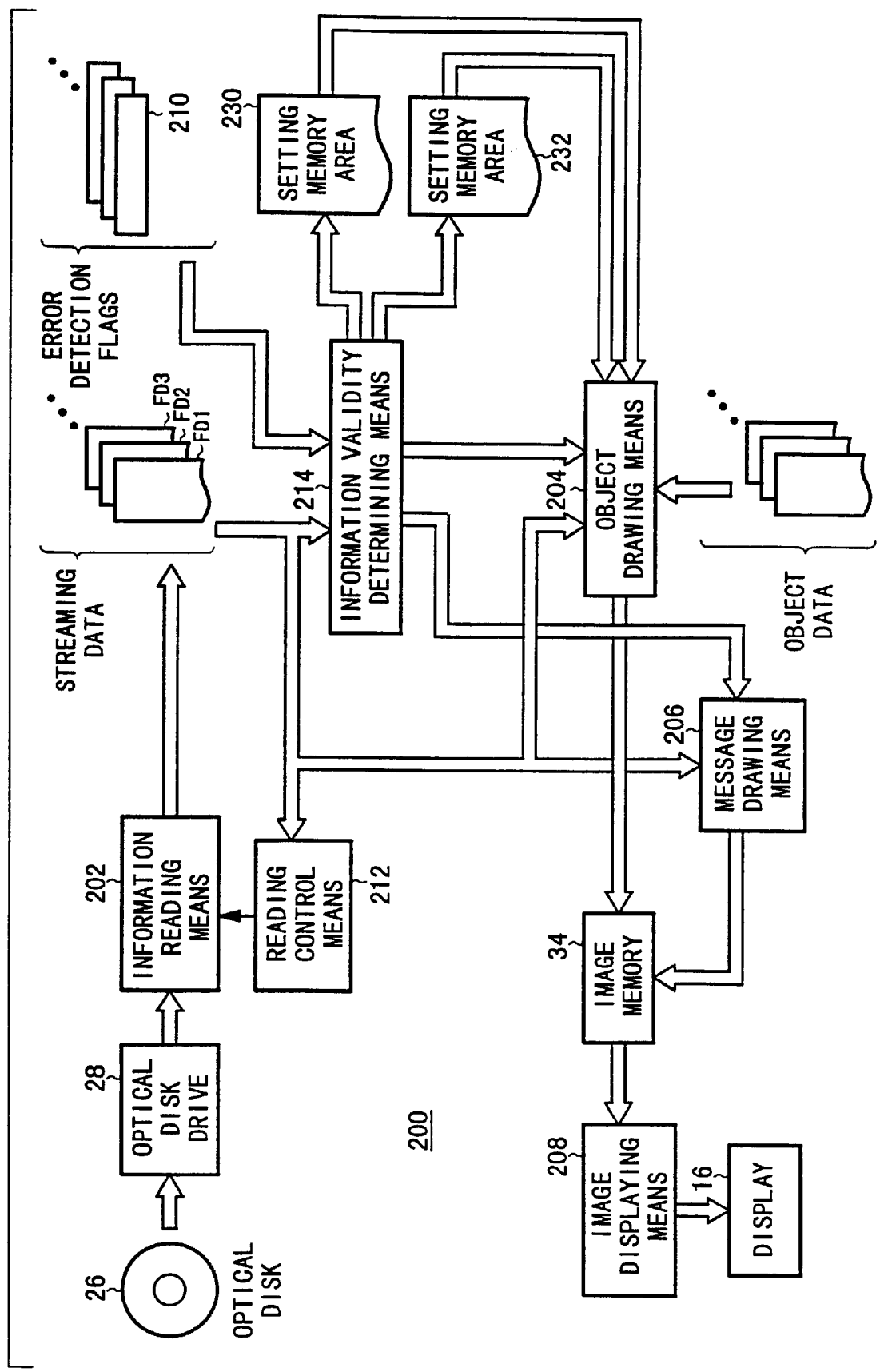
FIG. 8 is a functional block diagram showing a system of image drawing means executable on the entertainment apparatus according to the present embodiment.

As shown in FIG. 8, the image drawing means 200 comprises information reading means 202, object drawing means 204, message drawing means 206, and image displaying means 208. The information reading means 202 reads information from streaming data comprising a lot of frame data FD (FD1, FD2, FD3, . . . ) such that sector data SD are successively read sector by sector in each of the frame data FD (FD1, FD2, FD3, . . . ). The object drawing means 204 performs image processing for displaying an animation of three-dimensional images based on at least motion data contained in the read sector data SD in each of the frame data FD. The message drawing means 206 performs image processing for displaying a message 104 based on data concerning the message 104 in each of the frame data FD. The image displaying means 208 displays image data drawn in the image memory 34 on the screen 102 of the display 16.

The object drawing means 204 draws polygons of one or more three-dimensional images in the image memory 34. The three-dimensional images indicate objects in one scene based on one frame data FD. The message drawing means 206 reads valid compressed data parts DP from a plurality of frame data FD needed for displaying a message 104 for a predetermined period of time, and decompresses the read compressed data parts DP to restore original bitmap message data (bitmap data BMD). Then, the message drawing means 206 draws the bitmap data BMD at coordinate positions corresponding to data indexes DI. The number of bitmap data BMD corresponds to the number of words (data units) in the message.

The information reading means 202 reads data from the optical disk 20 with the optical disk drive 28 sector by sector and stores the read data (sector data SD) in the main memory 14. Then, the information reading means 202 performs an error detecting process by detecting reading errors based on reading error signals supplied from the optical disk drive 28 and by setting bits of error detection flags corresponding to the detected reading errors.

In addition, the image drawing means 200 comprises reading control means 212 and information validity determining means 214. The reading control means 212 controls the reading process of the information reading means 202 based on the read sector data SD. The information validity determining means 214 determines whether the read sector data SD is valid or not based on bit information of error detection flags 210.

Figure 9:
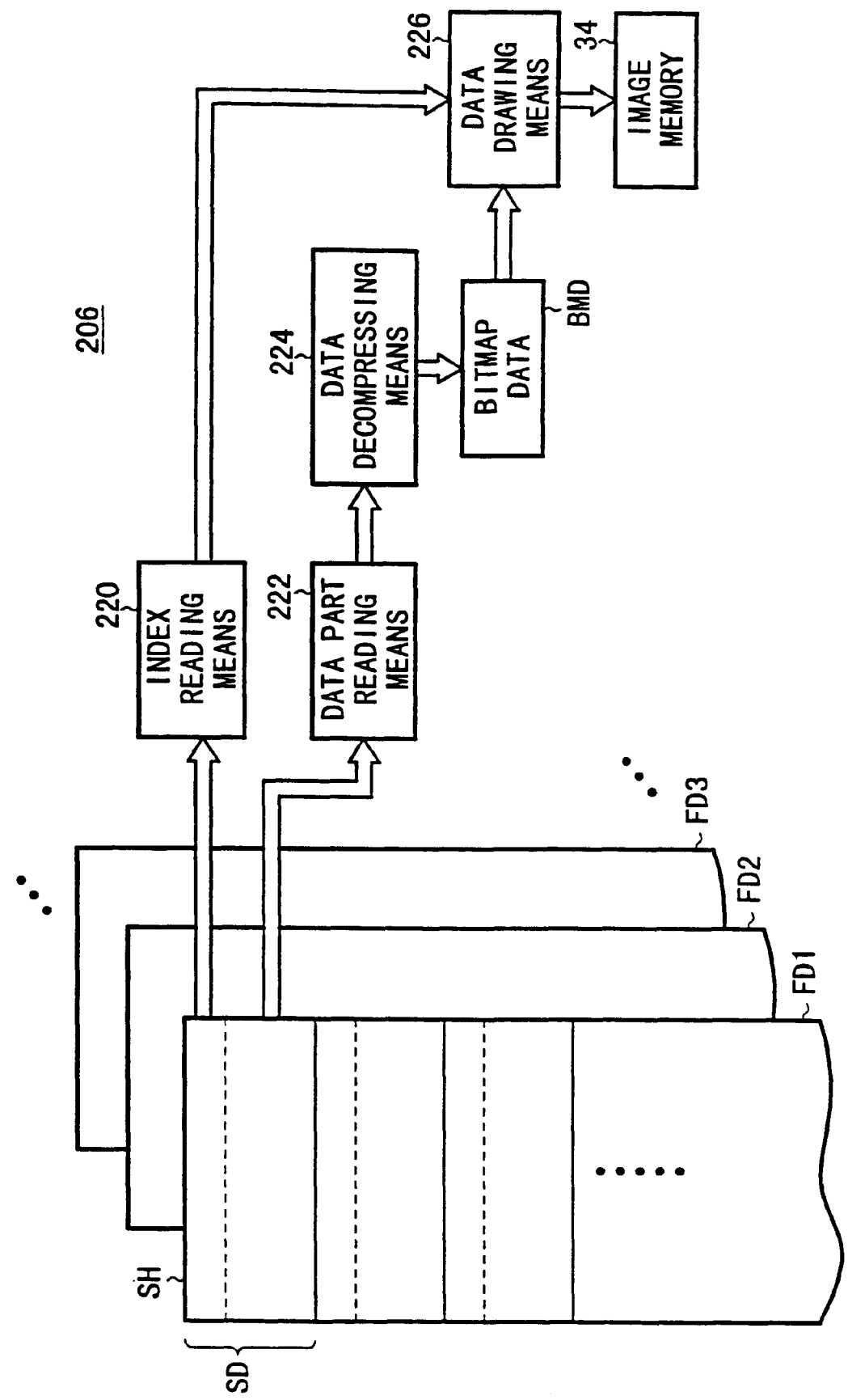
FIG. 9 is a functional block diagram showing a system of message drawing means.

As shown in FIG. 9, the message drawing means 206 comprises index reading means 220, data part reading means 222, data decompressing means 224, and data drawing means 226. The index reading means 220 reads message indexes (data indexes DI and part indexes PI) from the valid sector data SD. The data part reading means 222 reads message data parts TDP from the valid sector data SD. The data decompressing means 224 decompress compressed data parts DP of the read message data parts TDP and generate bitmap data BMD. The data drawing means 226 draw the generated bitmap data BMD in the image memory 34, at positions indicated by the indexes.

Next, a processing sequence of the image drawing means 200 will be described with reference to flowcharts of FIGS. 10 through 16. In the following description, it is assumed that the image drawing means 200 and the information validity determining means 214 can be operated simultaneously in a multitask environment. Further, it is assumed that the number of frame data FD read by the information reading means 202 at a time corresponds to the number of frames needed for displaying a message for a predetermined period of time. Alternatively, the information reading means 202 may read a predetermined number of frames, for example, 20 frames at a time.

According the present embodiment, an interlocking mechanism is adopted so that the information reading means 202 and the information validity detecting means 214 do not access the same frame data FD at the same time. That is, the working memory areas and the error detecting flags 210 are operated as a pseudo-double buffer.

Figure 10:
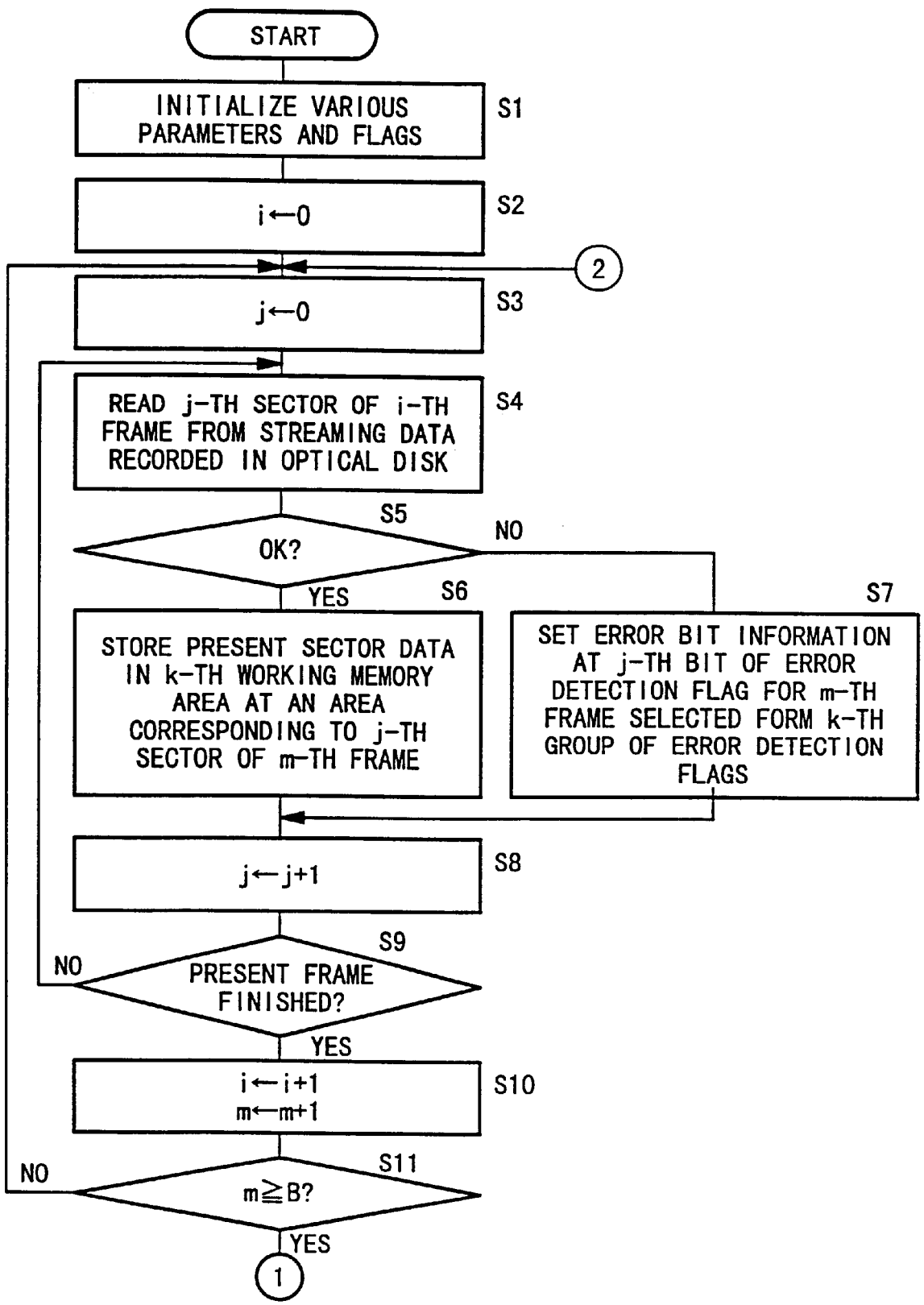
FIG. 10 is a flowchart (No. 1) showing a processing sequence of the image drawing means.

A processing sequence of the image drawing means 200 will be described with reference to FIG. 10. In step S1, various parameters and flags are initialized. For example, an index register k for selecting a working memory area is initialized by storing an initial value "1" in the index register k, an index register m for selecting an area for storing frame data FD in the working memory area is initialized by storing an initial value "0" in the index register m, and the error detection flags 210 are initialized. Further, the number of sectors A constituting frame data FD is set at its maximum value Amax, and the time for displaying a message (the number of frames B) is set at its maximum value Bmax.

Then, in step S2, an index register i for retrieving a frame data FD from the optical disk 26 is initialized by storing an initial value "0" in the index register i. Then, in step S3, an index register j for retrieving a sector is initialized by storing an initial value "0" in the index register j.

Then, in step S4, the information reading means 202 controls the optical disk drive 28 to read sector data SD in a j-th sector of an i-th frame from streaming data recorded in the optical disk 26. Then, in step S5, it is determined whether a reading error is detected from the optical disk drive 28 or not.

If no reading error is detected, control passes to step S6. In step S6, the information reading means 202 stores the read sector data SD in a k-th working memory area at an area corresponding to a j-th sector of an m-th frame.

If a reading error is detected, control passes to step S7. In step S7, the information reading means 202 sets bit information (for example, "1") at a j-th bit of an error detection flag 210 for the m-th flame selected from a k-th group of error detection flags. That is, an error bit is set at the j-th bit of the error detection flag 210.

When the process in step S6 or the process in step S7 is finished, control passes to step S8. In step S8, the index register j is updated by incrementing the value of the index register j by 1. Then, in step S9, the reading control means 212 determines whether all the sector data SD in the present frame data FD have been accessed or not.

Specifically, the determination is performed in the following manner. If there is sector data SD which is read from the frame data FD without any errors, it is determined whether the value of the index register j is equal to or greater than the number of sectors A constituting the frame data FD or not. The number of sectors A is registered in the sector headers SH. If there is no sector data SD which is read from the frame data FD without any errors, it is determined whether the value of the index register j is equal to or greater than the maximum number of sectors Amax.

The maximum number of sectors Amax is determined in the initial setting. Normally, at least one sector data SD is read from the frame data FD without any errors. Therefore, the determination is basically performed by determining whether the value of the index register j is equal to or greater than the number of sectors A or not.

If it is determined that all the sector data SD in the present frame data FD have not been accessed, control passes back to step S4 for repeating the processing sequence in step S4 and the subsequent steps.

If it is determined that all the sector data SD in the present frame data FD have been accessed, control passes to step S10. In step S10, the index registers i and m are updated by incrementing the values of the index registers i and m by 1, respectively. Then, in step S11, the reading control means 212 determines whether all the frame data FD corresponding to the number of frames for displaying the present message for a predetermined period of time have been accessed or not.

Specifically, the determination is performed in the following manner. If there is message texture information which is read from the frame data FD without any errors, it is determined whether the value of the index register m is equal to or greater than the number of frames B for displaying the message for a predetermined of time or not. If there is no message texture information which is read from the frame data FD without any errors, it is determined whether the value of the index register m is equal to or greater than the maximum number of frames Bmax. The maximum number of sectors Bmax is determined in the initial setting. Normally, at least one piece of message texture information is read from the frame data FD without any errors. Therefore, the determination is basically performed by determining whether the value of the index register m is equal to or greater than the number of frames B or not.

If it is determined that all the frame data FD corresponding to the number of frames for displaying the present message for a predetermined period of time have not been accessed, control passes back to step S3 for repeating the processing sequence in step S3 and the subsequent steps.

Figure 11:
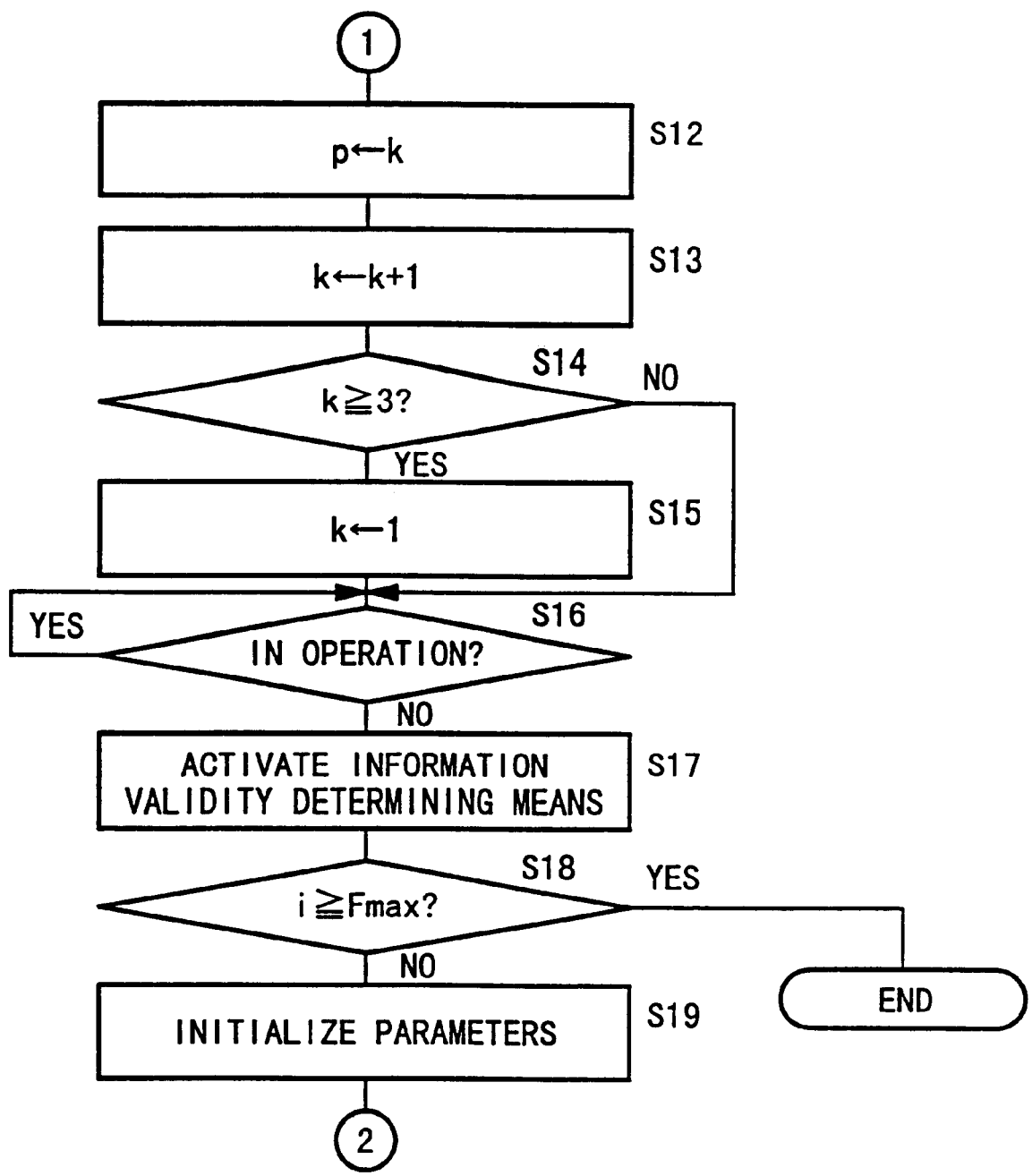
FIG. 11 is a flowchart (No. 2) showing a processing sequence of the image drawing means.

If it is determined that all the frame data FD corresponding to the number of frames for displaying the present message for a predetermined period of time have been accessed, control passes to step S12 of FIG. 11. In step S12, the present value of the index register k is stored in an index register p. Then, in the subsequent steps S13 through S15, a value indicating a working memory area different from the previous working memory area is stored in the index register k.

Then, in step S16, it is determined whether the information validity determining means 214 is currently in operation or not. For example, it is determined whether an operation flag is "0" indicative of "not in operation" or not.

If it is determined that the information validity determining means 214 is not in operation, control passes to step S17. In step S17, the information validity determining means 214 is activated. Then, in step 18, it is determined whether all the processes have been finished or not, i.e., it is determined whether all the frame data FD have been processed or not. If there is sector data SD which is read from the frame data FD without any errors, it is determined whether the value of the index register i is equal to or greater than the value of the frame size Fmax or not. The value of the frame size Fmax is registered in the sector headers SH.

If it is determined that all the processes have not been finished yet, control passes to step S19. In step S19, initialization of parameters is performed. Specifically, the index register m is initialized. Further, the number of sectors A constituting the frame data FD, and the number of frames B for displaying a message 104 for a predetermined period of time are initialized to their maximum values Amax, Bmax. Thereafter, control passes back to step S3 of FIG. 10 for repeating the processing sequence in step S3 and the subsequent steps.

When it is determined that all the processes have been finished in step S18, the processing sequence of the image drawing means 200 is brought to an end.

Next, a processing sequence of the information validity determining means 214 will be described with reference to FIGS. 12 through 16. Firstly, in step S101 of FIG. 12, the information validity determining means 214 sets the value of the operation flag to "1" indicating that the information validity detecting means 214 is in operation. Then, in step S102, an index register n for retrieving a frame is initialized by storing an initial value "0" in the index register n.

Then, in steps S103 and S104, it is determined whether camera data (CG data) in frame data FD of an n-th frame in a p-th working area is valid or not. Specifically, the determination is performed based on information from an error detection flag 210 for the n-th frame in a p-th group of error detection flags, i.e., information concerning a bit position corresponding to the camera data.

If it is determined that camera data is valid, control passes to step S105. In step S105, the present camera data is stored in a camera setting memory area 230 (see FIG. 8). Then, in step S106, a camera validity flag is set to "1" indicating that the camera data is valid.

Then, in steps S107 and S108, it is determined whether light source data in the frame data FD of the n-th frame in the p-th working area is valid or not. Specifically, the determination is performed based on information from the error detection flag 210 for the n-th frame in the p-th group of error detection flags, i.e., information concerning a bit position corresponding to the light source data.

If it is determined that light source data is valid, control passes to step S109. In step S109, the present light source data is stored in a light source setting memory area 232 (see FIG. 8). Then, in step S110, a light source validity flag is set to "1" indicating that the light source data is valid.

Figure 13:
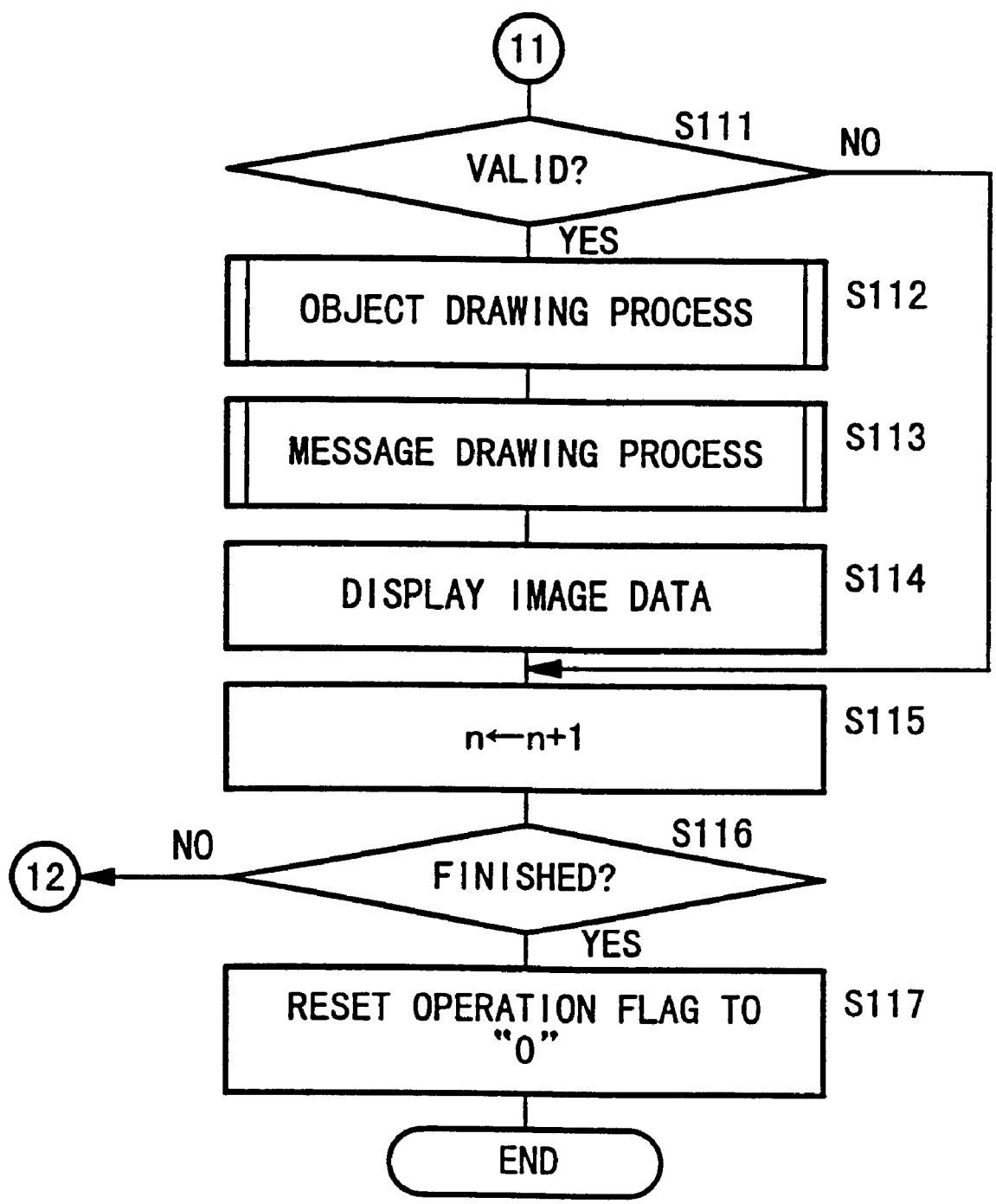
FIG. 13 is a flowchart (No. 2) showing a processing sequence of the information validity determining means.
Figure 14:
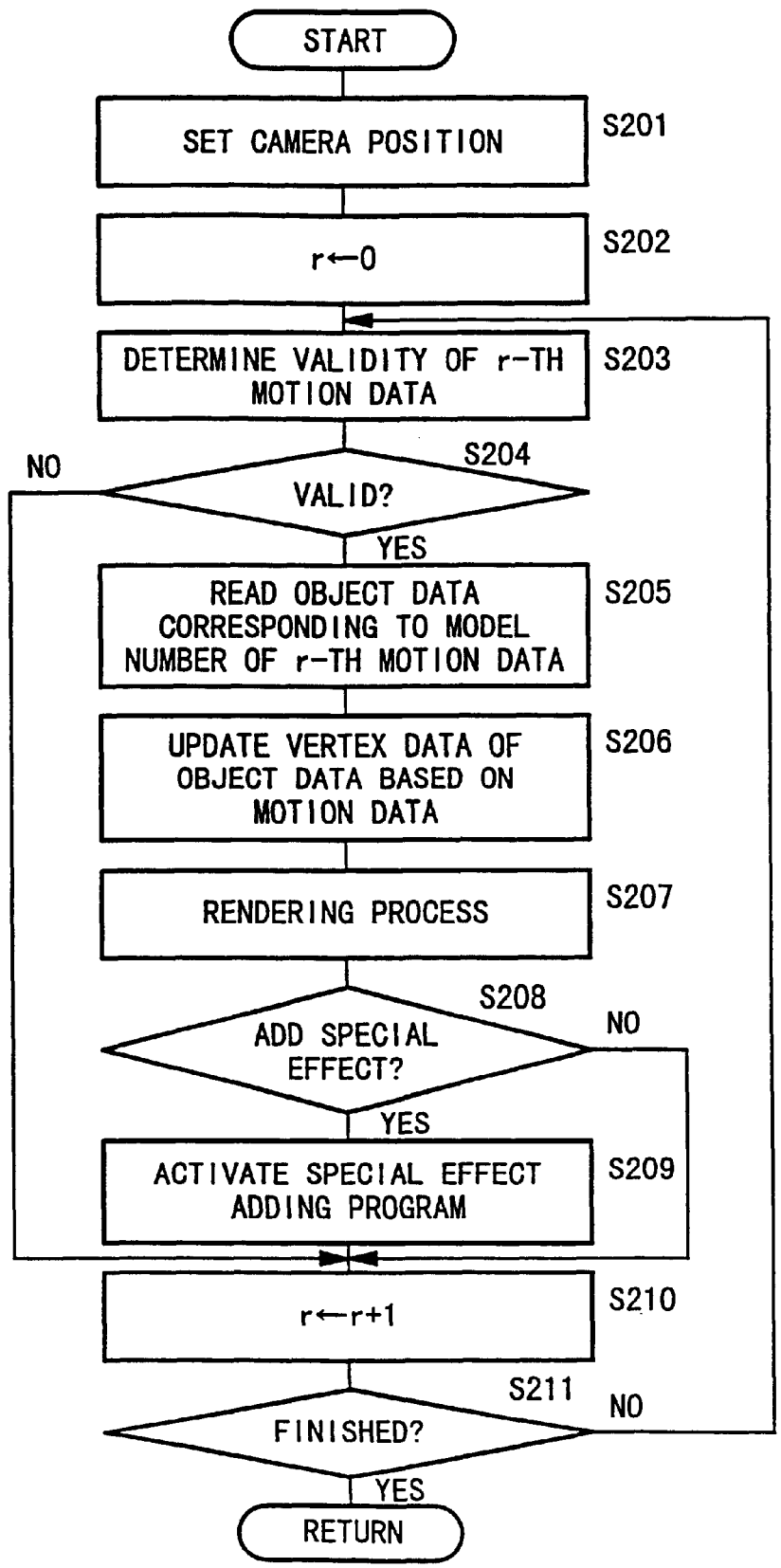
FIG. 14 is a flowchart showing a processing sequence of object drawing means.

Then, in step S111 of FIG. 13, it is determined whether both camera data and light source data are valid or not. Specifically, it is determined whether both camera validity flag and light source validity flag are set to "1" or not.

If it is determined that both camera data and light source data are valid, control passes to step S112 for performing the process of the object drawing means 204. A processing sequence of the object drawing means 204 will be described with reference to FIG. 14. In step S201, a camera position is set based on the camera data stored in the camera setting memory area 230.

Then, in step S202, an index register r for retrieving motion data is initialized by storing an initial value "0" in the index register r.

Then, in steps S203 and S204, it is determined whether r-th motion data in frame data FD of the n-th frame in the p-th working memory area is valid or not. Specifically, the determination is performed based on information from the error detection flag 210 for the n-th frame in the p-th group of error detection flags, i.e., information concerning a bit position corresponding to the r-th motion data.

If it is determined that motion data is valid, control passes to step S205. In step S205, object data corresponding to the model number of the r-th motion data is read.

Then, in step S206, vertex data of the object data is updated based on the present motion data. Then, in step S207, rendering is performed for the object data. Specifically, optical properties are added to the object data based on the light source data or the like, and texture mapping is performed for the object data to generate three-dimensional image data corresponding to the model number. The generated three-dimensional image data is drawn in the display memory area 34b of the image memory 34. In the rendering process, an animation data of an object having eyes and a mouth which open and close alternately based on eye data and mouth data in the motion data is drawn in the display memory area 34b of the image memory 34.

Then, in step S208, it is determined whether it is necessary to add a special effect to the object corresponding to the present model number. Specifically, it is determined whether the model number is associated with a special effect or not based on an object information table. For example, smoke, flame, or fog can be used as a special effect.

If the model number is associated with a special effect, control passes to step S209 for activating a special effect adding program registered in the object information table. For example, the special effect adding program is registered in a record corresponding to the model number. By executing the special effect adding program, an image of a special effect such as smoke, flame, or fog is drawn in the display memory area 34b of the image memory 34.

When the process in step S209 is finished, or if it is determined that the r-th motion data is not valid in step S204, control passes to step S210 for updating the index register r by incrementing the value of the index register r by 1. Then, in step S211, it is determined whether all the objects in the present frame have been drawn or not. Specifically, it is determined whether all the motion data in the present frame data FD have been accessed or not. Stated otherwise, it is determined whether the value of the index register r is equal to or greater than the number of motion data registered in the frame data FD or not.

If it is determined that all the objects in the present frame have not been drawn in step S211, control passes back to step S203 for drawing another object based on the next motion data. If it is determined that all the objects in the present frame have been drawn in step S211, the processing sequence of the object drawing means 204 is brought to an end.

Then, control passes back to the routine of FIG. 13. In step S113, the process of the message drawing means 206 is performed. A processing sequence of the message drawing means 206 will be described with reference to FIG. 15. In step S301, an index register u for retrieving a valid word is initialized by storing an initial value "0" in the index register u.

Then, in step S302, it is determined whether the present process is for a new message 104 or not. Specifically, it is determined whether the value of the index register n is "0" or not. If it is determined that the present process is for a new message 104, control passes to step S303 for updating an index register s for retrieving a frame by storing an initial value "0" in the index register s.

Then, in step S304, an index register t for retrieving a sector is initialized by storing an initial value "0" in the index register t. Then, in steps S305 and S306, it is determined whether t-th sector data in frame data FD of an s-th frame in the p-th working memory area is valid or not.

The determination is performed based on information from detection flags 210 for the s-th frame in the p-th group of error detection flags. In particular, the determination is performed based on information concerning a bit position corresponding to the t-th sector data SD. Further, it is determined whether there is a message data part TDP in the t-th sector data SD or not. The presence of the message data part TDP in the t-th sector data SD can be verified by determining whether values of the data index DI and the part index PI registered in the sector header SH of the t-th sector data SD are valid or not.

If it is determined that the t-th sector data SD is valid, control passes to step S307. In step S307, the index reading means 220 reads the indexes (data index DI and part index PI) from the sector header SH.

Then, in step S308, it is determined whether the present compressed data part DP has already been processed or not, i.e., whether the present compressed data part DP has already been decompressed and drawn in the texture memory area 34a of the image memory 34 or not. Specifically, it is determined whether the present part index PI has already been processed or not.

If it is determined that the present compressed data part DP has not been processed yet, control passes to step S309. In step S309, the data part reading means 222 reads the compressed data part DP from the sector data SD. Thereafter, in step S310, the data decompressing means 224 decompresses the read compressed data part DP to generate one unit (word) of message data (bitmap data BMP) based on information such as a data part size.

Then, in step S311, the data drawing means 226 draw the generated bitmap data in the texture area 34a, at a coordinate position corresponding to the data index DI. Then, in step S312, the value of the index register u is incremented by 1.

Figure 16:
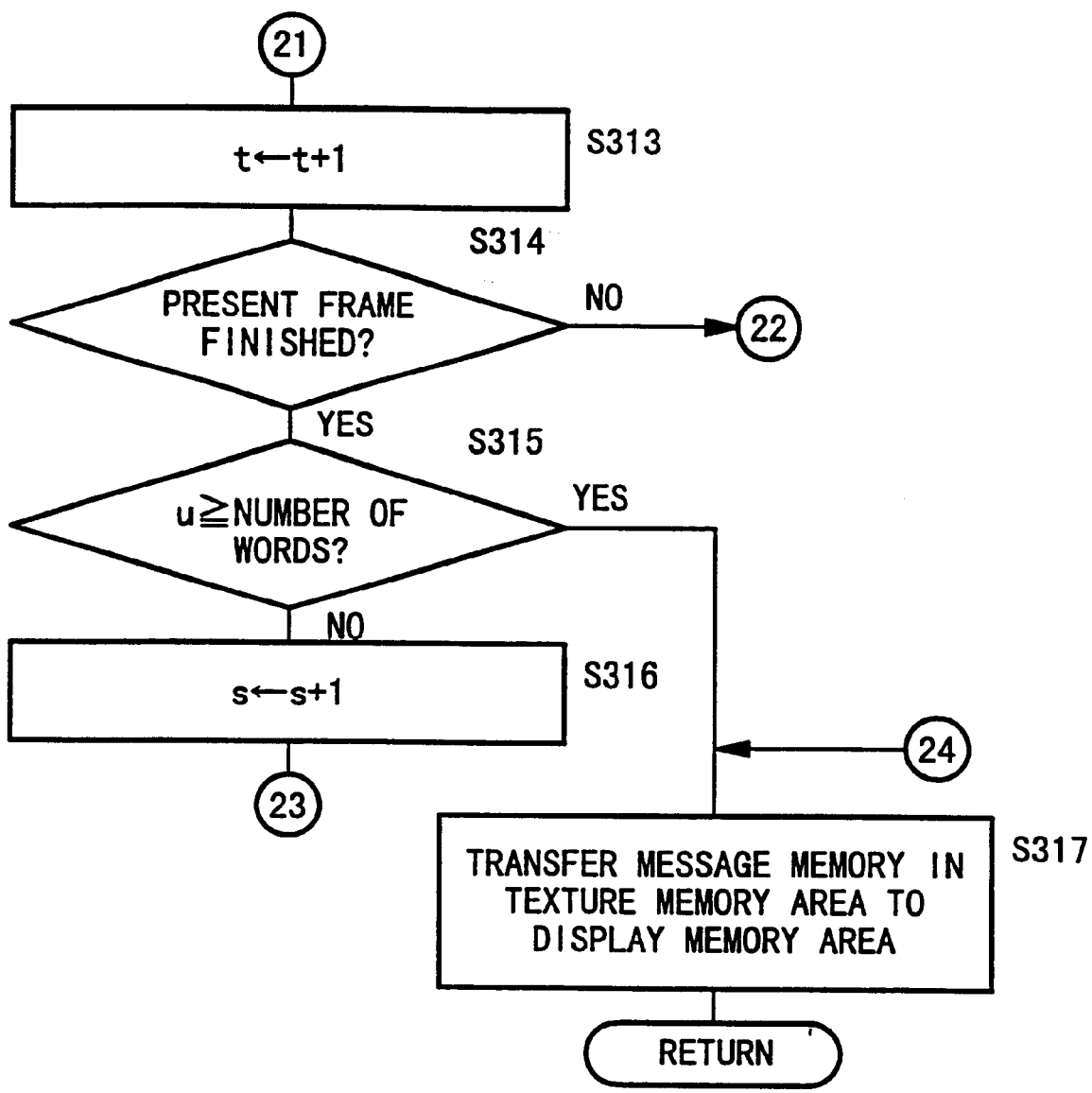
FIG. 16 is a flowchart (No. 2) showing a processing sequence of the message drawing means.

When the process in step S312 is finished, or if it is determined that the compressed data part DP has already been processed in step S308, or if it is determined that the sector data SD is not valid in step S306, control passes to step S313 of FIG. 16. In step S313, the value of the index register t is incremented by 1.

Then, in step S314, it is determined whether all the sector data SD in the present frame data FD have been accessed or not. Specifically, it is determined whether the value of the index register t is equal to or greater than the number of sectors A constituting the present frame.

Figure 15:
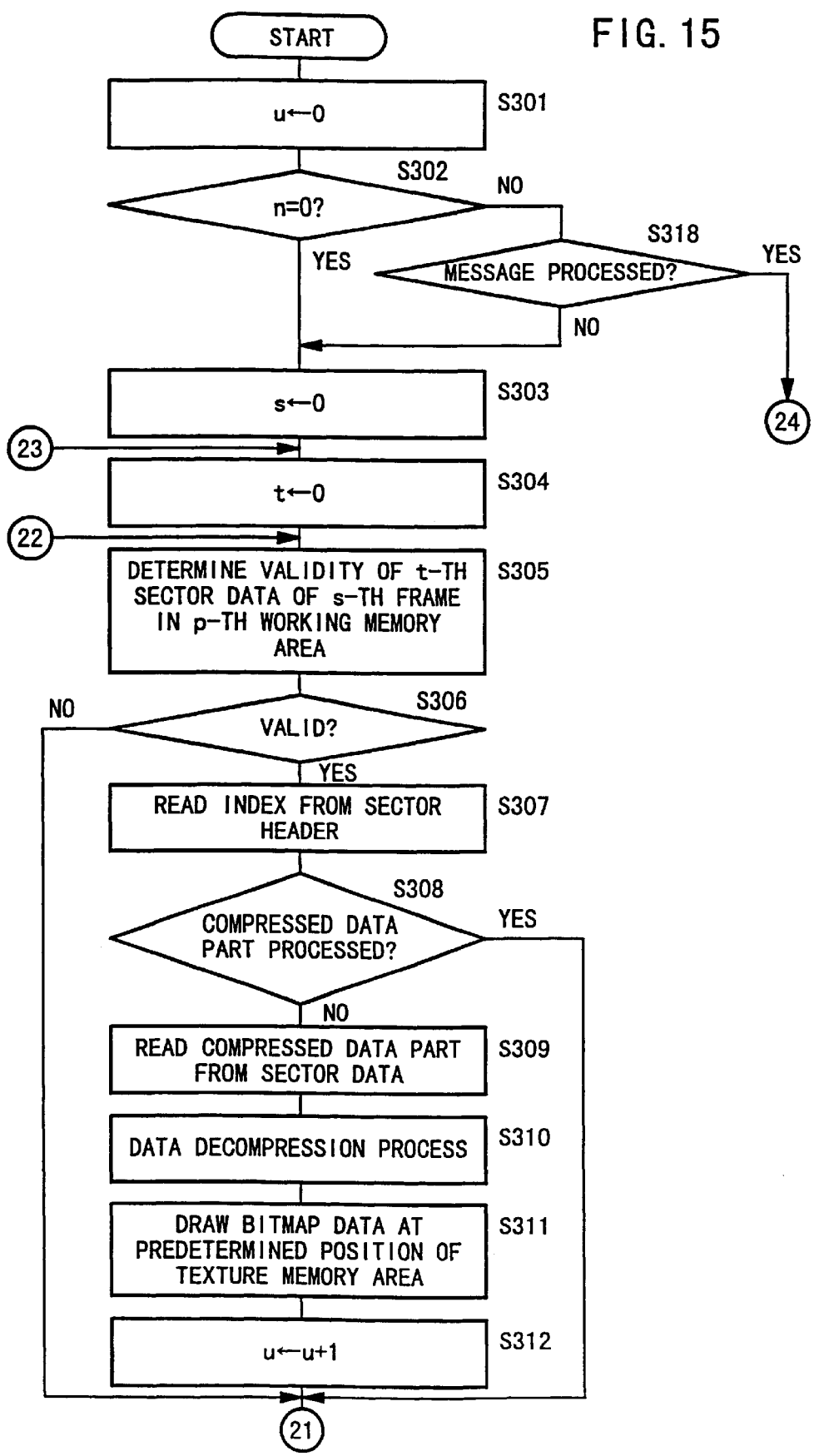
FIG. 15 is a flowchart (No. 1) showing a processing sequence of the message drawing means.

If it is determined that all the sector data SD in the present frame data FD have not been accessed yet, control passes back to step S305 of FIG. 15 for processing another sector data SD. If it is determined that all the sector data SD in the present frame data FD have been accessed, control passes to step S315 of FIG. 16. In step S315, it is determined whether the process for the present message 104 is finished or not. Specifically, it is determined whether the value of the index register u is equal to or greater than a predetermined number of words or not.

If it is determined that the process for the present message 104 is not finished, control passes to step S316 for incrementing the value of the index register s by 1. Then, control passes back to step S304 of FIG. 15 for repeating the processing sequence in step S304 and the subsequent steps. If it is determined that the process for the present message 104 is finished, control passes to step S317 of FIG. 16. In step S317, the data drawing means 226 transfers image data of the present message 104 having the predetermined number of words (data units) from the texture memory area 34a to the display memory area 34b.

If it is determined that the present process is not for a new message 104 in step S302 of FIG. 15, control passes to step S318. In step S318, it is determined whether the process for the present message 104 is finished or not. If it is determined that the process for the present message is not finished, control passes to step S303 and the subsequent steps. If it is determined that the process for the present message is finished, control passes to step S317 of FIG. 16 for drawing the predetermined number of words (data units), i.e., image data of the message 104 at predetermined coordinate positions in the display memory area 34b.

When the process in step S317 is finished, the processing sequence of the message drawing means 206 is brought to an end.

Then, control passes back to the routine of FIG. 13. In step S114, the image displaying means 208 outputs image data drawn in the image memory 34 to the display 16 for displaying the image data of objects and the message 104 on the screen of the display 16.

When the process in step S114 is finished, or if it is determined that camera data or light source data is not valid in step S111, control passes to step S115 for incrementing the value of the index register n by 1.

Then, in step S116, it is determined whether all the frame data FD corresponding to the number of frames needed for displaying the present message 104 for a predetermined period of time have been accessed or not. Specifically, it is determined whether the value of the index register m is equal to or greater than the number of frames B needed for displaying the message for a predetermine period of time or not. The number of frames B is registered as the message texture information.

Figure 12:
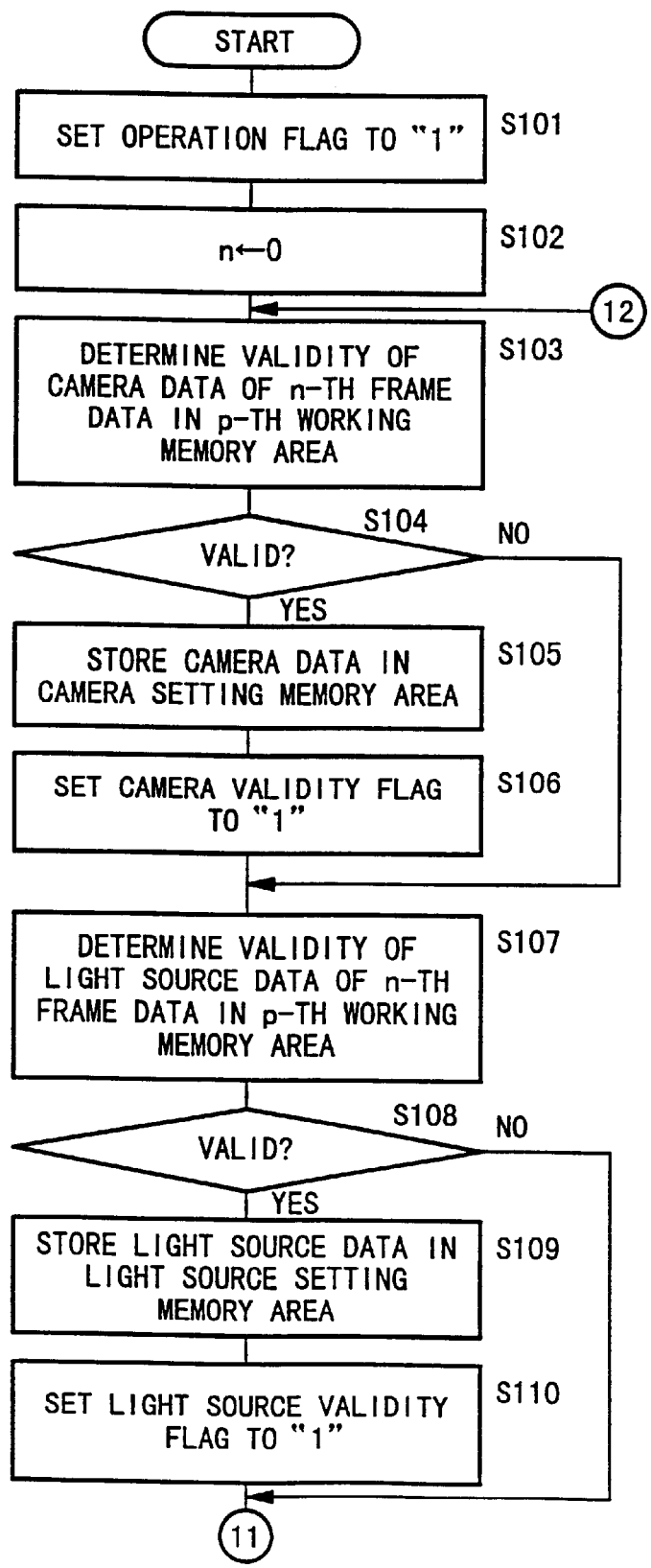
FIG. 12 is a flowchart (No. 1) showing a processing sequence of information validity determining means.

If all the frame data FD corresponding to the number of frames B needed for displaying the message for a predetermined period of time have not been accessed yet, control passes back to step S103 of FIG. 12 for processing another frame data FD.

If all the frame data FD corresponding to the number of frames B needed for displaying the message for a predetermined period of time have been accessed, control passes to step S117 of FIG. 13 for resetting the value of the operation flag to "0". Then, the processing sequence of the information validity determining means 214 is brought to an end.

With the operations of the information reading means 202, the reading control means 212, the information validity determining means 214, the object drawing means 204, and the message drawing means 206, one or more three-dimensional images of objects are drawn in the image memory 34 frame by frame.

Further, a plurality of valid sector data SD are read from a plurality of frame each having same message data.

Data units (words) of compressed data parts DP in the plurality of sector data SD are decompressed to generate bitmap data BMD, respectively. The generated bitmap data BMD are drawn at predetermined positions based on indexes (data indexes DI and part indexes PI) in a plurality of valid sector headers SH read from the plurality of the frame data FD.

That is, the process of drawing objects is performed by drawing three-dimensional image of the objects based on motion data registered in each of frame data FD and the process of drawing a message 104 is performed by drawing the message based on same message data registered in a plurality of frame data FD corresponding to the number of frames needed for displaying the message 104.

As described above, according to the present embodiment, one frame data FD comprises a plurality of sector data SD as packet data. Message data parts TDP as parts (words as data units) for generating a message are stored in the sector data SD. Compressed data parts DP included in the message data parts TDP are decompressed to generate bitmap data BMD. Indexes (data index DI and part index PI) indicating the positions of the bitmap data BMD are stored in each of the sector headers SH of the sector data SD. Therefore, the message data as well as motion data for displaying an animation of three-dimensional images can be included in streaming data.

Accordingly, it is possible to display polygons of objects in real time and also display messages in animations displayed while and before an actual scenario of a video game is executed, for example.

In particular, according to the present embodiment, same message data (message data parts TDP) such as compressed data parts DP and indexes DI, PI for one message is stored in a plurality of frame data FD (FD1, FD2, FD3, . . . ) corresponding to the number of frames needed for displaying the message for a predetermined period of time. Further, as described above, the message data is stored in the plurality of the frame data FD such that the message data parts TDP as data packets of words are registered word by word in the respective sector data SD. Indexes (data index DI and part index PI) indicating positional information of the bitmap data BMD generated by decompressing the compressed data parts DP are stored in the sector headers SH of the sector data SD. Therefore, it is possible to reduce packet losses in reading streaming data stored in the optical disk 26 or the like. Further, it is possible to reduce errors in reading message data (message data parts TDP) such as indexes (DI, PI). Accordingly, it is possible to reliably display messages on the screen.

Further, according to the present embodiment, the data parts DP in the message data parts TDP are compressed. Accordingly, the amount of data for recording the message data can be effectively reduced.

According to the present embodiment, errors are detected in reading sector data SD from the streaming data sector by sector. Based on the reading error information, validity of at least message data in one frame data FD is determined. If there is invalid sector data SD (message data), the invalid sector data SD can be compensated by reading the same message data in another frame data FD. Therefore, even if there is an error in reading message data in one frame data FD, it is possible to clearly display the message on the screen.

The image drawing method, the image drawing apparatus, the recording medium, and the program of the present invention shall not be limited to the embodiments disclosed herein. It will be apparent to a person skilled in the art that various modifications may be made without departing from the gist of the present invention.

What is claimed is:

1. An image drawing method comprising the steps of:
   reading streaming data made up of a lot of frame data sector by sector;
   performing an object drawing process to display an animation of three-dimensional images on a screen based on at least motion data in each of said frame data; and
   performing a message drawing process to display messages on the screen based on message data in each of said frame data,
   wherein same message data indicative of one message is stored in a plurality of frame data of said streaming data, said message data comprising a plurality of packet data each indicating a message image and a plurality of index data each indicating positional information of a message image; and
   wherein, in said message drawing process, message images indicated by a plurality of packet data are drawn at predetermined positions based on a plurality of index data to display a message on the screen.

2. An image drawing method according to claim 1, wherein each of packet data is compressed data, and, in said message drawing process, a plurality of packet data are decompressed to generate message images and said generated message images are drawn at predetermined positions based on a plurality of index data to display a message on the screen.

3. An image drawing method according to claim 1, wherein a plurality of packet data are successively stored in a plurality of sectors of one frame data, and each of index data is stored in a sector header.

4. An image drawing method according to claim 1, wherein said same message data is stored in a plurality of frame data corresponding to the number of frames needed for displaying a message for a predetermined period of time.

5. An image drawing method according to claim 1, further comprising the steps of:
   detecting errors in reading said streaming data sector by sector;
   determining validity of at least said message data in one frame data based on information of said detected errors; and
   compensating invalid packet data and index data in said message data by reading same message data in another frame data.

6. An image drawing apparatus comprising:
   means for reading streaming data made up of a lot of frame data sector by sector;
   means for performing an object drawing process to display an animation of three-dimensional images on a screen based on at least motion data in each of said frame data; and means for performing a message drawing process to display messages on the screen based on message data in each of said frame data, wherein same message data indicative of one message is stored in a plurality of frame data of said streaming data, said message data comprising a plurality of packet data each indicating a message image and a plurality of index data each indicating positional information of a message image; and wherein said means for performing a message drawing process draws message images indicated by a plurality of packet data based on a plurality of index data to display a message on the screen.

7. An image drawing apparatus according to claim 6, wherein each of packet data is compressed data, and said means for performing a message drawing process decompresses a plurality of packet data to generate message images and draws said generated message images at predetermined positions based on a plurality of index data to display a message on the screen.

8. An image drawing apparatus according to claim 6, wherein a plurality of packet data are successively stored in a plurality of sectors of one frame data, and each of index data is stored in a sector header.

9. An image drawing apparatus according to claim 6, wherein said same message data is stored in a plurality of frame data corresponding to the number of frames needed for displaying a message for a predetermined period of time.

10. An image drawing apparatus according to claim 6, said means for reading streaming data comprising:

means for detecting errors in reading said streaming data sector by sector, wherein said image drawing apparatus further comprises means for determining validity of at least said message data in one frame data based on information of said detected errors; and wherein said means for performing a message drawing process compensates invalid packet data and index data in said message data by reading same message data in another frame data.

11. A recording medium for storing a program comprising the steps of:

reading streaming data made up of a lot of frame data sector by sector;

performing an object drawing process to display an animation of three-dimensional images on a screen based on at least motion data in each of said frame data; and performing a message drawing process to display messages on the screen based on message data in each of said frame data, wherein same message data indicative of one message is stored in a plurality of frame data of said streaming data, said message data comprising a plurality of packet data each indicating a message image and a plurality of index data each indicating positional information of a message image; and wherein, in said step of performing a message drawing process, message images indicated by a plurality of packet data are drawn at predetermined positions based on a plurality of index data to display a message on the screen.

12. A recording medium according to claim 11, wherein each of packet data is compressed data, and, in said step of performing a message drawing process, a plurality of packet data are decompressed to generate message images and said generated message images are drawn at predetermined positions based on a plurality of index data to display a message on the screen.

13. A recording medium according to claim 11, wherein a plurality of packet data are successively stored in a plurality of sectors of one frame data, and each of index data is stored in a sector header.

14. A recording medium according to claim 11, wherein said same message data is stored in a plurality of frame data corresponding to the number of frames needed for displaying a message for a predetermined period of time.

15. A recording medium according to claim 11, said step of reading streaming data comprising the step of detecting errors in reading said streaming data sector by sector, wherein said program further comprises the step of determining validity of at least said message data in one frame data based on information of said detected errors; and wherein, in said step of performing a message drawing process, invalid packet data and index data in said message data are compensated by reading same message data in another frame data.

16. A recording medium for storing streaming data used by a program comprising the steps of:

performing an object drawing process to display an animation of three-dimensional images on a screen; and performing a message drawing process to display messages on the screen, wherein said streaming data comprises a plurality of frame data each having motion data used in said object drawing process and message data used in said message drawing process; and wherein same message data indicative of one message is stored in a plurality of frame data of said streaming data, said message data comprising a plurality of packet data each indicating a message image and a plurality of index data each indicating positional information of a message image.

17. A recording medium according to claim 16, wherein each of packet data is compressed data.

18. A recording medium according to claim 16, wherein a plurality of packet data are successively stored in a plurality of sectors of one frame data, and each of index data is stored in a sector header.

19. A recording medium according to claim 16, wherein said same message data is stored in a plurality of frame data corresponding to the number of frames needed for displaying a message for a predetermined period of time.

20. A program comprising the steps of:

reading streaming data made up of a lot of frame data sector by sector;

performing an object drawing process to display an animation of three-dimensional images on a screen based on at least motion data in each of said frame data; and performing a message drawing process to display messages on the screen based on message data in each of said frame data, wherein same message data indicative of one message is stored in a plurality of frame data of said streaming data, said message data comprising a plurality of packet data each indicating a message image and a plurality of index data each indicating positional information of a message image; and wherein, in said step of performing a message drawing process, message images indicated by a plurality of packet data are drawn at predetermined positions based on a plurality of index data to display a message on the screen.

* * * * *